United States Patent [19]

Schmidt et al.

[11] Patent Number: 5,156,219

[45] Date of Patent: * Oct. 20, 1992

[54] POSITIONING APPARATUS FOR DRAWN IMPLEMENT

[75] Inventors: Eugene H. Schmidt; Lee F. Nikkel, both of Madrid, Nebr.

[73] Assignee: A.I.L., Inc., North Platte, Nebr.

[*] Notice: The portion of the term of this patent subsequent to Jun. 25, 2008 has been disclaimed.

[21] Appl. No.: 706,690

[22] Filed: May 29, 1991

Related U.S. Application Data

[63] Continuation-in-part of Ser. No. 533,018, Jun. 4, 1990, Pat. No. 5,025,866.

[51] Int. Cl.⁵ .................... A01B 63/32; B62D 1/26
[52] U.S. Cl. ........................ 172/5; 180/131; 248/654
[58] Field of Search .............. 172/5, 6, 233, 456, 172/776; 180/131; 104/244.1; 171/8; 248/654

[56] References Cited

U.S. PATENT DOCUMENTS

| | | | |
|---|---|---|---|
| 4,031,962 | 6/1977 | Ellinger | 171/8 |
| 4,074,766 | 2/1978 | Orthman | 172/456 |
| 4,281,720 | 8/1981 | Tusing | 172/776 |
| 4,336,846 | 6/1982 | Boetto | 172/776 |
| 4,449,590 | 5/1984 | Williamson | 172/456 |
| 4,607,716 | 8/1986 | Beck | 172/26 |
| 4,640,365 | 2/1987 | Schmidt | 172/26 |
| 4,835,691 | 5/1989 | Rotem et al. | 172/6 |
| 4,930,581 | 6/1990 | Fleischer et al. | 172/6 |
| 5,025,866 | 6/1991 | Schmidt et al. | 172/6 |
| 5,031,704 | 7/1991 | Fleischer et al. | 172/6 |

FOREIGN PATENT DOCUMENTS 55168 4/1967 German Democratic Rep. .

OTHER PUBLICATIONS

Sunco, "Acura Trak", flyer, Feb. 1989.
Lincoln Creek Manufacturing, "Quick Hitch", flyer, Sep. 1988.

Primary Examiner—Dennis L. Taylor
Assistant Examiner—Spencer Warnick
Attorney, Agent, or Firm—Welsh & Katz, Ltd.

[57] ABSTRACT

Apparatus for guiding a drawn agricultural implement of the type which has a transverse tool bar and a pull hitch. The apparatus controls the horizontal angular orientation of the tool bar relative to the pull hitch to guide the implement.

20 Claims, 6 Drawing Sheets

POSITIONING APPARATUS FOR DRAWN IMPLEMENT

The present invention is a continuation-in-part of U.S. patent application Ser. No. 533,018, filed Jun. 4, 1990, now U.S. Pat. No. 5,025,866, by Eugene H. Schmidt and Lee F. Nikkel, and that application is assigned to the same assignee as the present application.

BACKGROUND OF THE INVENTION

The present invention is directed generally to a drawn implement equipped with an internal steering cylinder and steering arm for corrective steering of the implement when the towing vehicle becomes offset relative to a ground row because of driver fatigue or any other reason.

It has long been a problem in the operation of farm equipment to guide implements through a crop field without accidentally deviating from the crop rows and destroying planted crops. Some agricultural implements carry ground working tools spaced as close as four inches (4") apart. The tractor operator is generally situated in a cab located several feet above and forwardly of the implement where it may be difficult to view the actual engagement of the tools with the ground. Thus the operator must simply attempt to keep the tractor centered relative to the crop rows.

The problem of maintaining the ground working tools between the crop rows becomes critical in an operation, such as cultivating, where a slight lateral misalignment of the tractor relative to the crop rows will cause the implement to uproot several rows of crops. The problem is compounded by the great width of modern cultivators capable of working as many as sixteen (16) or more rows. Furthermore, as the operator spends many hours in the field, fatigue makes it increasingly difficult to constantly maintain proper steering of the tractor. In the small amount of time it takes to turn from observing the implement to looking forward to align the tractor in the row, several feet of crops in multiple rows can be uprooted.

For three-point hitch mounted implements, a row following guidance device has been disclosed in Schmidt U.S. Pat. No. 4,640,365, which provides a row following wheel or other sensor for detecting transverse movement of the implement relative to a crop row. The sensor is connected to a pair of hydraulic cylinders for pivoting the implement tool bar about an imaginary central vertical axis for corrective steering of the implement to maintain its proper position even when the tractor becomes offset relative to crop rows. Such a guidance device is commercially available from Sunco Marketing of North Platte, Nebr., under the ACURA-TRAK trademark. Because that device effectively accomplishes a shortening and lengthening of the two lower links of a three-point hitch connection to a tractor, it is inapplicable for drawn implements having a tongue adapted for connection to the drawbar of a tractor.

Previous attempts to afford corrective steering for drawn implements have all had certain shortcomings which limit their usefulness. For example, Titzmann, East German Patent No. 55,168, discloses an implement having a hitch arm pivotally connected to the implement with a hydraulic cylinder extending between the implement and a medial position of the hitch arm. The external connection of the hydraulic cylinder to the tool bar of the implement limits the positions along the tool bar at which ground working tools can be mounted, rendering the implement inoperative for certain tool placements. A similar hydraulic cylinder and hitch bar arrangement is disclosed is Beck, U.S. Pat. No. 4,607,716, wherein an auxiliary U-shaped frame extends forwardly of the tool bar for pivotal connection to the hitch arm. Schmidt U.S. Pat. No. 3,326,319, discloses an implement having a special articulated hitch arm with an external cylinder 14 to afford pivotal movement between the parts of the hitch arm. Finally, Collogan, U.S. Pat. No. 4,180,133, discloses another two-part articulated hitch arm requiring a double connection to the drawbar by both the forward portion of the hitch arm and a hydraulic cylinder having its other end connected to a brace on the side of the hitch arm. That cylinder, however, effects pivotal movement of the hitch arm relative to the tractor drawbar, leaving the implement frame freely pivotable relative to the opposite end of the hitch arm.

Perhaps the most significant use of the present invention will be on drawn agricultural planter implements. For ridge planting in particular, it is critical that the planter units follow the tops of the ridges to assure proper seed placement. To compensate for inevitable driver fatigue, a guidance system is required which can follow the old furrows and effect corrective steering of the planter implement to maintain its proper position even if the tractor varies somewhat from its intended path.

Proper implement placement relative to crop rows is particularly important for contour farming where the crop rows follow the edge of a terrace or extend around a hill. On the first pass along a contour, a cutter wheel makes a furrow that must be precisely followed by the planter on the next pass if uniform spacing between crop rows is to be maintained. Similar guidance is needed for following the furrow of an even row marker.

A primary object of the invention, therefore, is to provide a drawn implement with a guidance system capable of effecting pivotal steering movement of the implement frame relative to the hitch arm without interference with the mounting of tools on the implement frame.

Another object of the invention is to provide such a guidance system wherein the power source for effecting pivotal movement of the hitch arm is substantially concealed within the implement frame.

Another object is to provide such an implement wherein the pivotal connection between the hitch arm and power source is situated rearwardly of the pivotal connection of the implement frame to the hitch arm.

Another object is to provide a drawn implement with a guidance system which is simple and rugged in construction, economical to manufacture and efficient in operation.

Still another object of the present invention is to provide a guidance system for a drawn implement, which because of its improved design, can be easily installed in an implement with a minimum of effort, and can also be easily removed for repair if necessary.

A related object lies in the provision of being adapted to be installed by an original equipment manufacturer in its implements with a minimum of modifications.

Yet another related object lies in the provision of being capable of being installed on many existing implements, due to its clean and efficient design.

SUMMARY OF THE INVENTION

The row following-implement of the invention includes a transversely extended implement frame and an elongated hitch arm having a forward end adapted for connection to a towing vehicle and a rearward end connected to the frame for pivotal movement about an upright pivot axis adjacent the rearward end of the hitch arm. A power source is carried, on the frame and operatively connected between the hitch arm and frame for pivoting the hitch arm about its pivot axis. The power source is housed substantially within the confines of the frame to avoid interference with the mounting of tools or other equipment on the frame. A row follower is carried on the implement and is operative to sense transverse movement of the implement relative to a ground row. A row follower is operatively connected to the power source for actuating it to effect pivotal steering movement of the frame relative to the hitch arm in response to transverse movement of the implement relative to a ground row.

For an agricultural drawn implement, the implement frame is likely to be a transversely extended tool bar. It is preferred that the pivot axis for the hitch arm intersect the hitch arm forwardly of its rearward end with the power source being connected to the hitch arm rearwardly of the pivot axis. This arrangement is facilitated by providing the tool bar as an elongated main tubing member with mounting flanges extended forwardly therefrom at a position generally centered on the tubing member so that the hitch arm pivot axis intersects the mounting means forwardly of the main tubing member. The power source may be an extendable and retractable hydraulic cylinder situated within the main tubing member substantially parallel to the longitudinal axis thereof.

More stable guidance control is effected if the implement is equipped with a ground engaging stabilizer disc supported for rotation about a transverse pivot axis at a position rearwardly of the tool bar. A feedback sensor may be provided at the pivotal connection between the hitch arm and frame for sensing the relative pivotal position of the hitch arm relative to the tool bar. An electrical control box in the tractor cab is equipped with gauges showing the positions of the row follower and implement as well as control knobs for adjusting centering, sensitivity and feedback for the guidance system.

DESCRIPTION OF THE PREFERRED EMBODIMENT

The row following drawn implement 10 of the invention is illustrated in the drawings as including an elongated frame or tool bar 12 and a forwardly extending hitch arm 14 having forward and rearward ends 16 and 18. The forward end 16 of hitch arm 16 is adapted for connection to a towing vehicle such as the tractor 20 in FIG. 2. Accordingly, the forward end of the hitch arm may be provided with a clevis connector 22 for attachment to the tractor drawbar by a pin 24.

Figure 3:
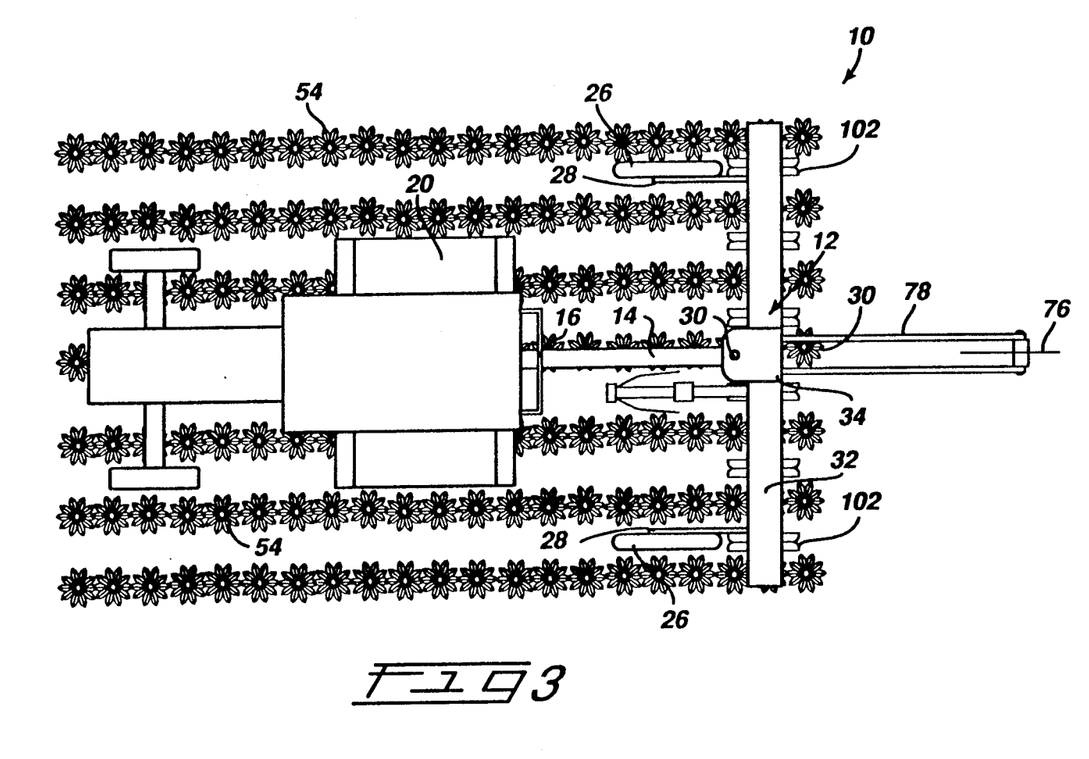
FIG. 3 is a top plan view of the implement being towed by a tractor properly aligned with the crop rows.

Referring to FIG. 3, the implement 10 is self supporting on its own ground wheels 26 which are rotatably mounted on the ends of wheel support arms 28 mounted on tool bar 12. Thus, implement 10 generally designates a drawn type implement, as opposed to a threepoint hitch implement which may be fully supported on the tractor.

Figure 1:
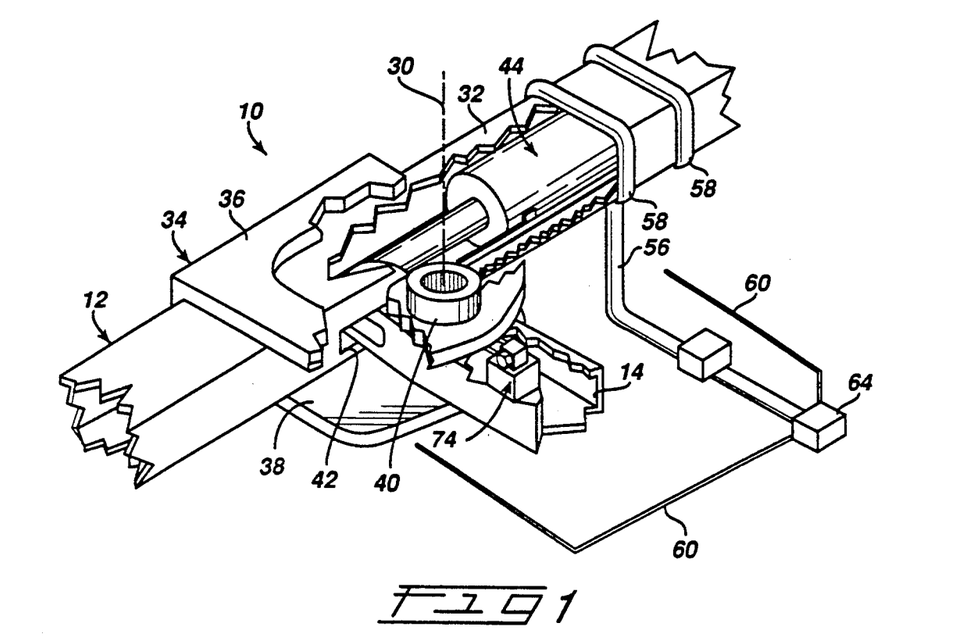
FIG. 1 is a foreshortened and partial perspective view, with portions broken away, showing the pivotal connection of the hitch arm to the tool bar of an agricultural drawn implement of the invention.
Figure 4:
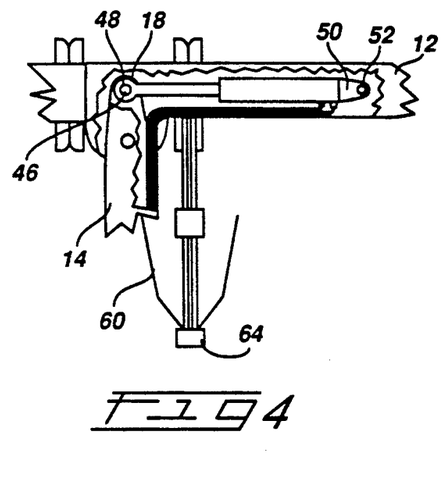
FIG. 4 is a partial top plan view, with portions broken away for clarity, showing the hitch arm connected to the tool bar at a perpendicular angle thereto.
Figure 5:
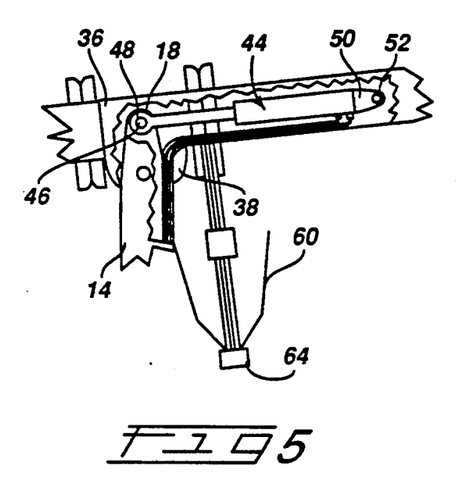
FIG. 5 is a partial top plan view, with portions broken away for clarity, showing the hydraulic cylinder partially retracted to effect pivotal movement of the tool bar relative to the hitch arm.

Whereas most drawn implements have a tongue or hitch arm which is rigidly connected to the frame or tool bar with no steering of the hitch arm relative to the tool bar, hitch arm 14 is pivotally connected to tool bar 12 for transverse pivotal movement about a generally upright pivot axis 30 adjacent to the rearward end 18 of hitch arm 14. For this purpose, the tool bar is considered to include an elongated main tubing member 32 and a generally U-shaped mounting bracket 34 fixed to the tool bar and having upper and lower forwardly projected flanges 36 and 38 through which a hitch pin 40 extends. Thus the pivot axis 30, through hitch pin 40, intersects the hitch arm 14 forwardly of the rearward end 18 thereof as clearly shown in FIGS. 4 and 5. The rearward end 18 of hitch arm 14 extends through an opening 42 through the front of tool bar 12 for pivotal connection to an extendable and retractable power means 44 situated substantially within the confines of tool bar 12 as shown in FIGS. 1, 4, and 5. The hitch arm 14 is preferably rotatable relative to the tool bar through an angle of approximately 20 degrees to approximately 26 degrees. The opening 42 is preferably sufficiently large to enable the power means 44 to be inserted inside of the tool bar during installation, and it also permits removal of the power means if repairs are needed. In this regard, it is preferred that the dimensions of the opening 42 be approximately 6.5 inches by 9.5 inches to easily accomplish such installation and removal. It should be understood that many implements have a tool bar that is approximately 7 inches square. In the event that larger or smaller tool bars are employed, the size of the opening would be sized accordingly.

Whereas the power means 44 is illustrated as a double acting hydraulic cylinder, it could alternately be a hydraulic or electric motor or even a mechanical linkage connected to such a cylinder or motor. In the illustrated embodiment, a pivot pin 46 connects the rearward end 18 of hitch arm 14 to the rod end 48 of hydraulic cylinder 50, the cylinder end of which is pivotally connected to the tool bar 12 at 52. As can be seen in FIGS. 4 and 5, retraction of hydraulic cylinder 50 causes pivotal steering movement of the tool bar 12 from its perpendicular position of FIG. 4 relative to hitch arm 14 to the inclined position indicated in FIG. 5. Similarly, extension of hydraulic cylinder 50 results in pivotal steering movement of the tool bar in the opposite direction. Thus, the power means 44 that is connected to the rearward end of the hitch arm 14 is capable of effecting a steering movement of the tool bar 12 relative to the tractor 20 for maintaining any tools on the tool bar in proper alignment with crop rows even when the tractor becomes misaligned with the crop rows due to operator fatigue or whatever other reason. The piston rod of the cylinder 50 preferably has a total stroke of approximately 6 inches, and is extending approximately 3 inches in the center position, so that retraction of approximately 3 inches results in angular movement of the hitch arm 14 relative to the tool bar of approximately 10 to 13 degrees in one direction. Extension of the piston rod approximately 3 inches results in the same angular movement in the other direction. Of course, it should be understood that the length of the stroke can be longer or shorter, depending upon the size of the cylinder 50. The length should be sufficient to achieve the desired angular movement and also, for the preferred embodiment that has the cylinder 50 within the hollow tool bar, the cylinder must be sized to permit its insertion and removal.

Figure 2:
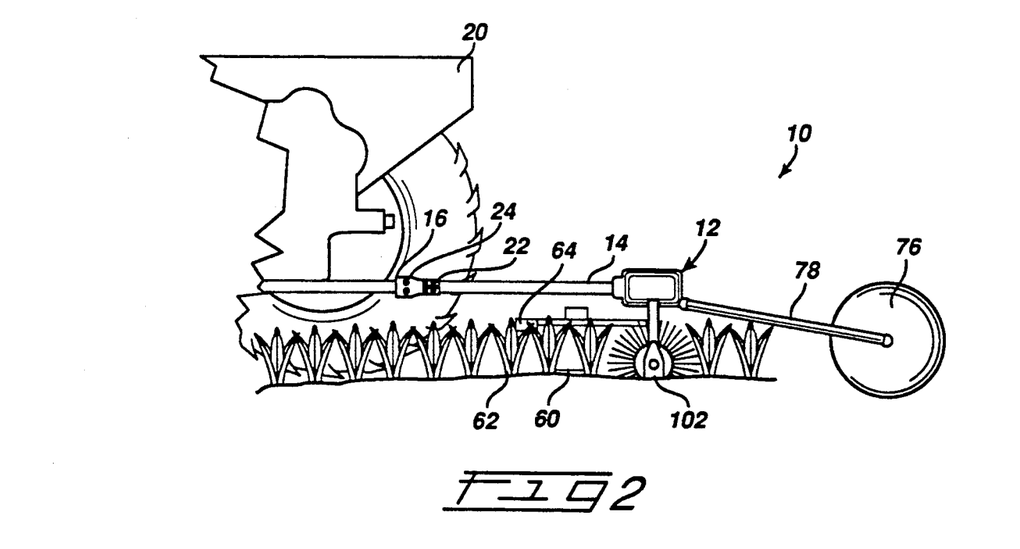
FIG. 2 is a side elevation of the implement being towed behind a tractor.
Figure 6:
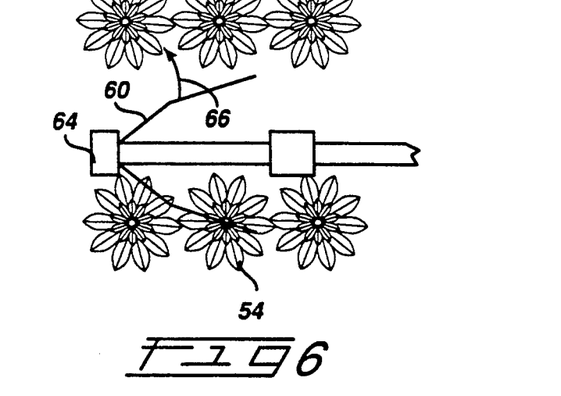
FIG. 6 is a partial detail top plan view showing operation of the wand-type row follower.
Figure 7:
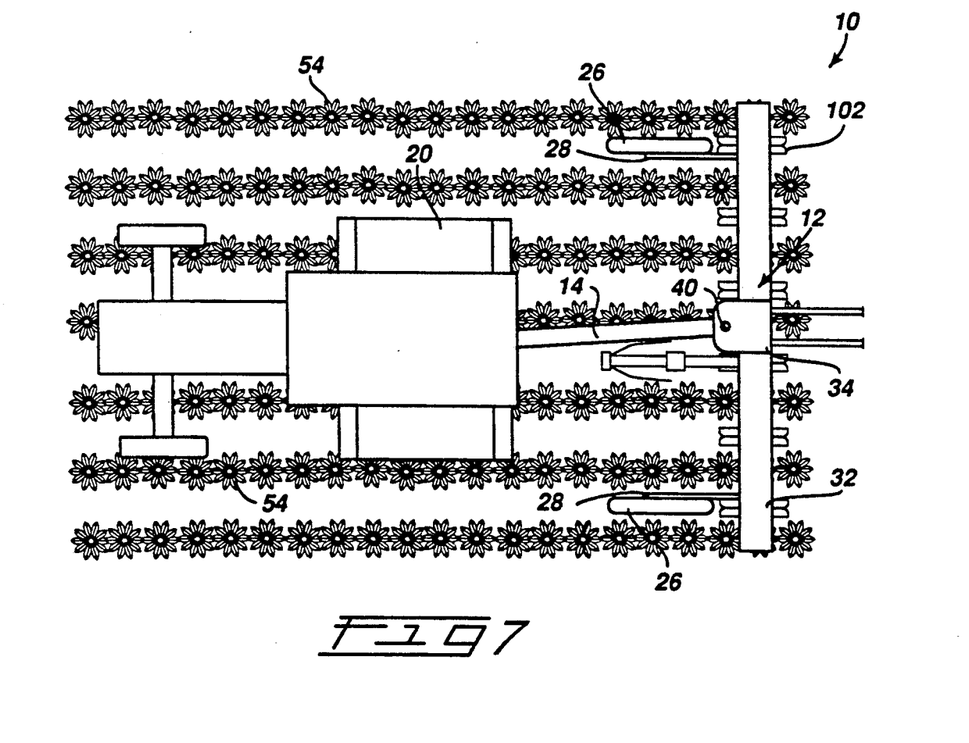
FIG. 7 is a top plan view of the implement being steered to maintain its proper position relative to the crop rows with the tractor laterally offset from its intended path.

To properly actuate the hydraulic cylinder 50, it is therefore necessary to sense the relative transverse position of tool bar 12 relative to crop rows indicated generally at 54 in FIGS. 6 and 7. For this purpose, a mounting arm 56 is connected to the tool bar 12 by a pair of clamps 58 or any other suitable means. Mounting arm 56 preferably extends downwardly and forwardly from the tool bar for pivotal connection to a row follower device. One such device includes a pair of crop engaging wire wands 60 as illustrated in FIGS. 1, 2, and 6, wherein the wands extend downwardly and rearwardly from a pivot shaft 62 protruding from the underside of a housing 64. When the tool bar is properly centered relative to the crop rows, the spaced apart wands fit between the adjacent rows, such that the pivot shaft 62 remains stationary as the implemented advances across a field. Upon transverse movement of the tool bar toward one crop row as illustrated in FIG. 6, the adjacent wand 60 engages that crop row causing the wands and pivot shaft 62 to rotate in the direction of arrow 66 in FIG. 6. Pivotal movement of shaft 62 relative to housing 64 is detected by a conventional sensor within housing 64 and electrically communicated through wire 67 to a control box 68, preferably positioned within the cab of tractor 20.

In the illustrated embodiment, the control box 68 reacts by directing a signal through wires 70 and 72 (FIG. 8) to cause adjustment of an electrically actuated hydraulic four-way valve 74 to cause hydraulic fluid to retract hydraulic cylinder 50 to produce a counterclockwise steering movement of tool bar 12 relative to hitch arm 14 as illustrated in FIGS. 5 and 7. Steering movement of the tool bar is dampened by at least one stabilizer disc 76 which may be rotatably mounted on a horizontal pivot shaft carried by stabilizer arms 78 which extend rearwardly from tool bar 12. As steering movement of the tool bar 12 causes it to return to its properly aligned position between the crop rows, that corrective movement is sensed by the wands 6 which thereby cause opposite rotation of pivot shaft 62 so that a signal from sensor 64 is directed through control box 68 to valve 74 for readjusting the angle between the tool bar and hitch arm 14 for maintaining the tool bar in its proper position relative to the crop rows.

While a single stabilizing disc 76 is shown in FIG. 2, it is preferred that a stabilizing disc be provided forwardly of the tool bar 12 and another be provided rearwardly of the tool bar. With two such stabilizing discs, more accurate guidance is achieved. However, it should be understood that a single disc may be employed, and it may be located forwardly of, rearwardly of or beneath the tool bar and proper guidance will be achieved. It should also be understood that the implement may be of the type which has wheels provided to support some of the weight of the implement, and in such event, a stabilizer disc 76 may not be required, although more accurate guidance will usually be achieved with at least one stabilizer disc 76.

Figure 8:
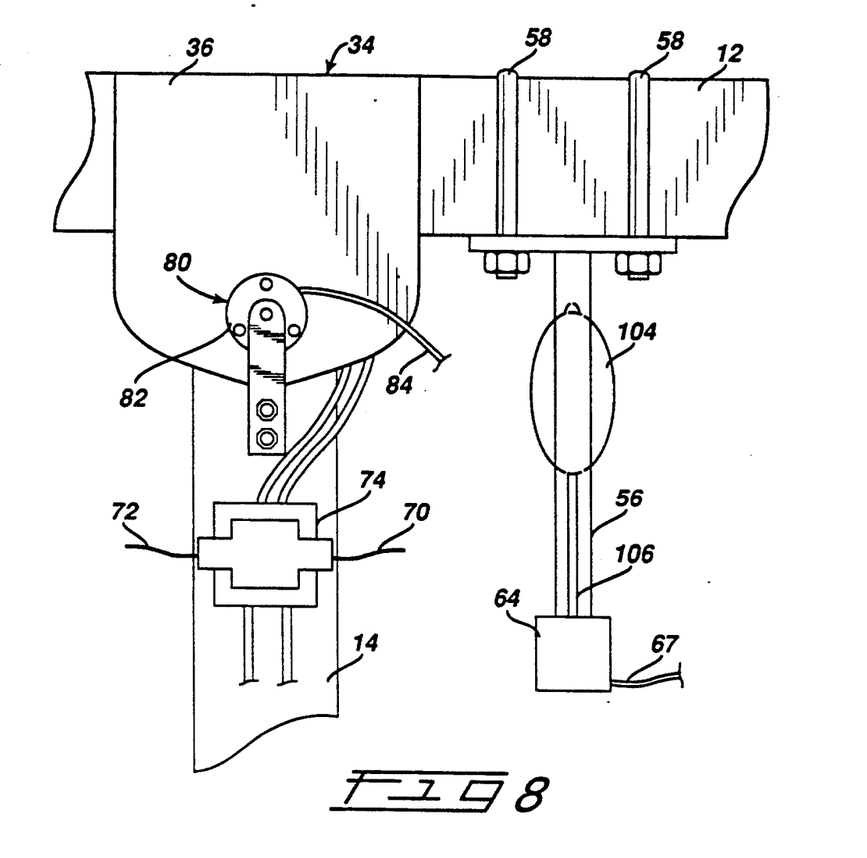
FIG. 8 is a partial top plan view showing the electrical and hydraulic controls for the guidance system of the invention.

Referring to FIG. 8, the relative pivotal position of the tool bar 12 relative to hitch arm 14 is continuously sensed by feedback sensor 80 on the hitch arm 14 mounting bracket 34. In one type of sensor, a magnet on a disc within sensor housing 82 pivots with the tool bar relative to a stationary sensor on hitch arm 14. The resulting signal is directed to the control box through wire 84.

Figure 9:
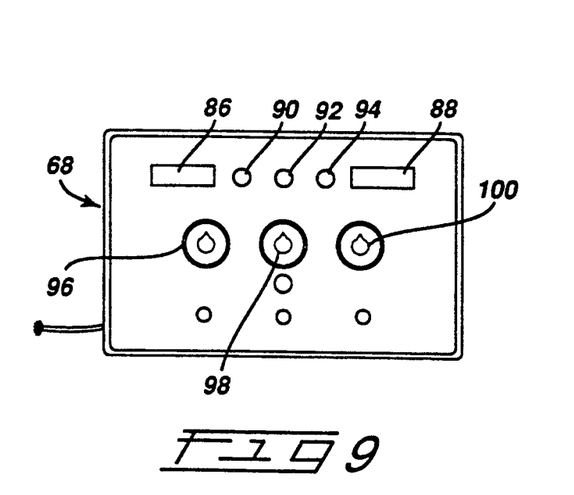
FIG. 9 is a diagrammatic front view of the face of the control box in the cab of the tractor.

The control box 68 may include a pair of bar graphs 86 and 88 which are respectively connected to sensors 64 and 80 for indicating the positions of wands 60 and tool bar 12 respectively. Between the bar graphs there is a amp 90 for signaling left output, a center on-off lamp 92 and a right lamp 94 for indicating right output. Three control knobs are provided including a centering knob 96, a sensitivity knob 98 and a feedback knob 100. The centering knob is for the purpose of changing the signals produced by the position of the wand sensor to move the machine toward one side or the other when the machine is biased in one direction such as when traversing a slope, for example. The sensitivity knob 98 adjusts the degree of rotation of pivot shaft 62 that will result in actuation of hydraulic cylinder 50. Finally, feedback knob 100 is rotatable clockwise to reduce feedback from the sensor 80. It is desirable to eliminate feedback at times depending on how the implement tools are configured. All three knobs are connected to conventional potentiometers.

In operation, when the tractor 20 and implement 10 are properly aligned relative to crop rows as illustrated in FIG. 3, the pivotal position of the tool bar 12 remains fixed relative to hitch arm 14. In response to transverse movement of the tool bar 12 relative to the crop rows, however, due to either curves in the crop rows or mis-steering of the tractor, the wands 60 engage the crop row toward which the implement is moved, thereby rotating the pivot shaft within sensor housing 64 and directing a signal through control box 68 to the hydraulic four-way valve 74 to effect pivotal steering movement of the tool bar 12 for realigning it relative to the crop rows. As the tool bar becomes realigned relative to the crop rows, wands 60 rotate in the opposite direction to return the pivot shaft 62 toward its neutral position, which rotation causes a signal to be directed through control box 68 to hydraulic valve 74 for again actuating hydraulic cylinder 50 to rotate the tool bar 12 back toward its perpendicular position of FIG. 4 relative to the hitch arm 14.

The sensing devices 64 and 80 are very sensitive so the angles illustrated in FIGS. 5 and 7 are exaggerated. In response to a small predetermined offset of the implement from its desired position relative to the crop rows, the tool bar is slightly pivoted for immediate corrective steering action so that the steering angle illustrated in FIG. 5 may never be necessary.

The implement 10, as shown in FIGS. 2 and 3, is a simplified representation of a plurality of ground working tools 102 mounted on the tool bar 12 in spaced apart relation for working the ground between crop rows. A most frequent application of the steering arm feature of the invention may be for agricultural planter implements. The ground wheel support arms 28 may be pivotally connected to the tool bar 12 for raising the tool bar and moving the wheels beneath it for transport between fields and over the road. It is apparent that the steering concept of the invention is applicable for the full range of drawn type implements used in agriculture, construction and industry. Whereas the frame to which the hitch arm 14 is connected is shown as a tool bar in the drawings, it is understood that the frame could have a significantly different structure even in the agricultural field, such as for an anhydrous tank implement.

It is a desirable feature of the invention that the hydraulic cylinder 50 or other power source or linkage that causes steering movement of the hitch arm 14 be situated substantially within the confines of the frame. In the example of the main tubing member 32 shown in FIG. 1, it is contemplated that the power source or linkage to the power source be situated within the tubing member so as not to interfere with placement of tools at most positions along the tool bar. For a tool bar of C-channel or I-beam construction, the power source is preferably placed between the flanges as much as is practicable and not extending outwardly from the web so as to avoid interference with the attachment of tools or other structure along the length of the tool bar and to protect the power source and linkage from being easily damaged. On other shaped frames, "substantially within the confines of said frame" contemplates placement at a position such that the power means 44 is substantially enclosed by portions of the frame and a plane across an adjacent opening in the frame. In other words, it is not critical that the power source be completely surrounded or enclosed. It preferably does not extend in any direction substantially beyond an adjacent portion of the frame. The object is to avoid interference with the attachment of tools or other accessories to the frame.

Turning to the alternative embodiment of the present invention shown in FIGS. 10 and 11, it will be described using reference numbers that are identical to those shown in FIGS. 1 through 9, where a substantially similar component is shown, and with a prime designation (') if it is a comparable component. The embodiment operates under the same theory of operation as the embodiment of FIG. 1, and therefore has a wand structure and hydraulic control valve and associated connecting hoses, all of which are not shown. The embodiment has an upper flange 36' and a lower flange 38', each of which have an angled portion extending away from the adjacent surface of the tool bar 12' to which each is attached by means of bolts (not shown) or weldments. The tool bar 12' in this embodiment does not have a mounting bracket such as the bracket 34 shown in FIG. 1. The flanges 36' and 38' each have a pair of reinforcing gusset plates 110 to provide rigidity and a thickened portion 112 located at the rearward portion of the gusset plates 110 and the respective flange. The hitch arm 14' has an end plate 114 to which is attached the rearward end portion 18' which comprises two spaced apart members and there are also two shorter members 116 that are attached to the plate 114 for added strength. The hitch pin 40' extends through apertures within the flanges 36', 38', the members 116 and 18', and there is a sensor device 80 located adjacent the hitch pin for measuring the angular position of the hitch arm relative to the tool bar 12'. The sensor device has a sensor arm 81 that is attached to the plate 38' and the arm rotates with the rotation of the hitch arm 14 relative to the plate 38'.

Figure 10:
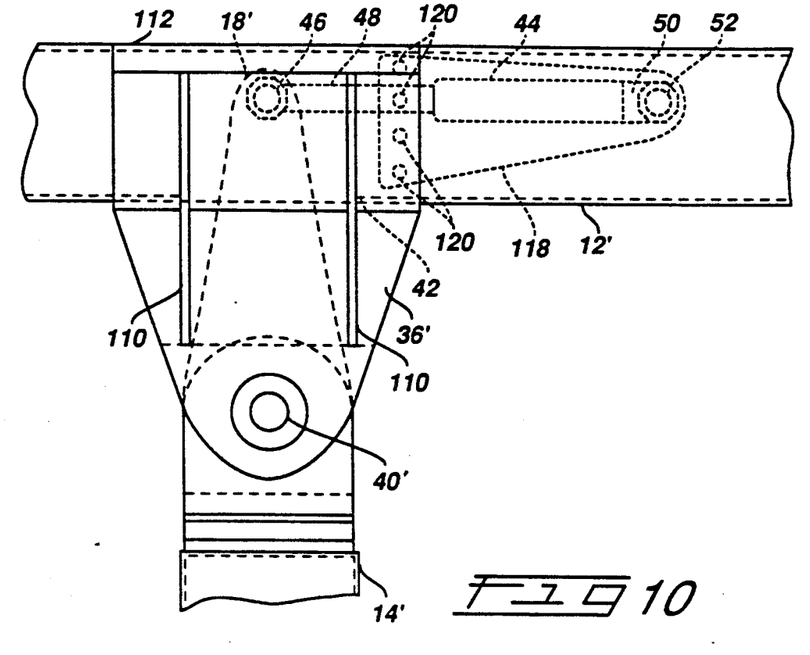
FIG. 10 is a top plan view showing an alternative embodiment of a portion of the present invention; and, FIG. 11 is a side elevation of the alternative embodiment of FIG. 10.
Figure 11:
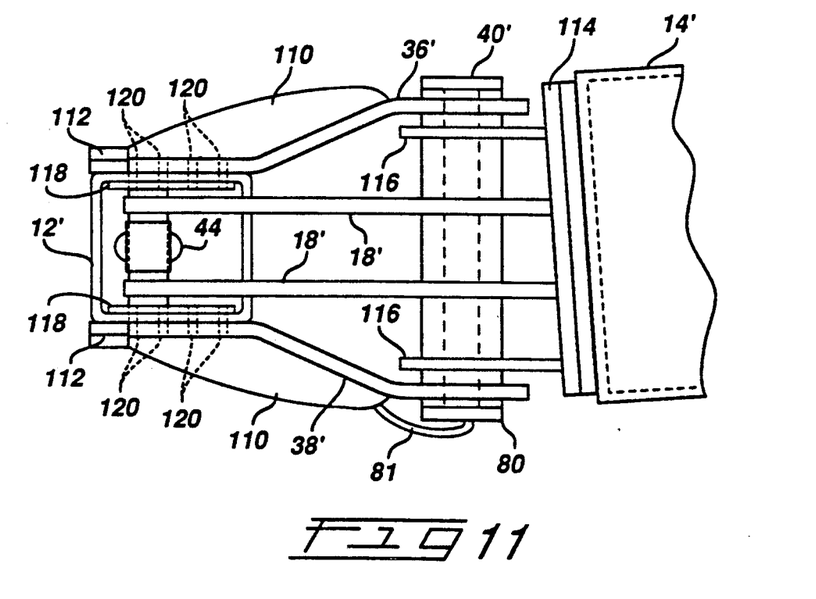

In accordance with an important aspect of this embodiment, there are upper and lower elongated mounting plates 118 which are positioned within the tool bar, with the rightward end as shown in FIG. 10 gradually tapering in width, with the end providing structure to which a pin 52 secures the cylinder end 50 of the hydraulic cylinder 44. The rod end 48 is attached to the rearward end 18' of the hitch arm 14' by the pin 46. The tapering of the plates 118 enables the plates to be inserted into the opening 42 during installation, and to be removed if necessary. The plates 118 are preferably secured to the upper and lower faces of the tool bar by bolts (not shown) which are placed in aligned apertures 120 in the plates and adjacent faces of the tool bar. Since the apertures are located very near to the opening 42, there is adequate access for an individual to insert the bolts in the apertures and to either tighten or loosen the nuts of the bolts. During installation, the cylinder is installed, i.e., the pins 46 and 52 are secured, and the plates 118 with the cylinder 44 are inserted through the opening 42 and the bolts are then installed in the apertures 120. After this has been done, then the hitch pin 40' can be installed and the sensor arm 81 attached.

The invention has been shown and described in connection with a preferred and an alternative embodiment thereof and other alternatives are possible. For example, if the row being followed is a furrow instead of rows of planted crops, the somewhat football shaped sled 104 of FIG. 8 may be connected by an arm 106 to the pivot shaft 62 of sensor housing 64 in place of the wands 60. Other row following devices such as wheels or electronic, magnetic or visual sensors may be substituted where applicable. It is simply important that a device connected to a sensor on the implement be operative to detect transverse movement of the implement relative to a row being followed. Another example is a modification of the embodiment of FIGS. 10 and 11 which would have the hitch pin 40 located rearwardly of the tool bar 12', with the end 18' of the hitch arm 14 extending through openings in both the front and rear faces of the tool bar 12', with one of the openings being sufficiently large to permit insertion and removal of the cylinder. In such a configuration, the piston rod would be connected to the hitch arm 14 at a location within the tool bar. Additionally, it is contemplated that the tool bar 12, regardless of the cross sectional configuration, may be cut and a portion removed or the tool bar being lengthened by locating a module between the two sections of the tool bar. If such a modification were made, the portion of the module between the sections of the tool bar would be considered as part of the tool bar.

While various embodiments of the present invention have been shown and described, it should be understood that various alternatives, substitutions and equivalents can be used, and the present invention should only be limited by the claims and equivalents thereof.

Various features of the present invention are set forth in the following claims.

What is claimed is:

1. Apparatus for positioning an implement having an elongated hitch arm with a rearward end and a forward end, the forward end being configured to be attached to and be drawn by a drawing vehicle, the implement being of the type which has a generally transverse hollow tool bar and means located on the implement for engaging the ground for guiding the implement, the drawing vehicle having at least a center mounting hitch to which the hitch arm of the implement can be attached, said apparatus being means operatively attached to said hitch arm and said tool bar for selectively retracting and extending each side of the tool bar generally horizontally relative to the hitch arm to thereby adjust the angular orientation of the hitch arm relative to the tool bar, said apparatus comprising:

a first frame member attached to the center portion of said tool bar;

a pivot means being attached to said hitch arm so that said hitch arm is horizontally pivotable through a predetermined angular arc relative to the tool bar;

a hydraulic cylinder having a cylinder end and an extendable and retractable piston rod located within the confines of the tool bar said cylinder end being operatively connected to one of said tool bar and said hitch arm and said piston rod being operatively connected to the other thereof, said cylinder being generally parallel to the lengthwise direction of the tool bar, so that movement of said piston rod moves the end portion of said hitch arm generally transverse to the lengthwise direction of the tool bar;

hitch sensing means for sensing the angular orientation of the hitch arm relative to the tool bar and generating a signal indicative of said sensed orientation;

wand means operatively associated with said apparatus and configured to detect the lateral position of the implement relative to a desired path as the drawing vehicle moves generally along the desired path;

wand sensing means for sensing the position of said wand means and generating a signal that is indicative of said sensed position;

means for controlling said hydraulic means for adjusting the angular orientation of the tool bar relative to the hitch arm so that the implement follows a desired path of movement in response to said signals from said hitch sensing means and wand sensing means.

2. Apparatus as defined in claim 1 wherein said predetermined arc is within the range of approximately 20 degrees to approximately 26 degrees.

3. Apparatus as defined in claim 1 wherein said hydraulic cylinder is a double acting cylinder configured to selectively forcefully retract and extend said piston rod.

4. Apparatus as defined in claim 3 wherein said piston rod of said cylinder is extended approximately ½ of its stroke when said hitch arm is substantially perpendicular to said tool bar, so that further extension of said piston rod moves the hitch arm in one angular direction relative to the tool bar, and retraction of the piston rod moves the hitch arm in the other angular direction.

5. Apparatus as defined in claim 1 wherein said pivot means is spaced from said tool bar.

6. In an agricultural implement of the type which has an elongated generally transverse tool bar and a hitch arm having a forward end for attachment to a mounting hitch of a drawing vehicle and means located on the implement for engaging the ground for guiding the implement, apparatus for varying the horizontal angular orientation of the hitch arm relative to the tool bar for the purpose of laterally positioning the implement to follow a desired path as the drawing vehicle draws the implement, said apparatus comprising:

pivoting means including power means operatively attached to said hitch arm and said tool bar for generally horizontally pivoting the tool bar relative to the hitch arm to thereby adjust the angular orientation of the hitch arm relative to the tool bar, said power means being located in the same vertical plane as the tool bar and being substantially parallel to the tool bar;

hitch sensing means for sensing the angular orientation of the hitch arm relative to the tool bar and generating a signal indicative of said sensed orientation;

wand means operatively associated with said apparatus and configured to detect the lateral position of the implement relative to the desired path as the drawing vehicle moves generally along the desired path;

wand sensing means for sensing the position of said wand means and generating a signal that is indicative of said sensed position;

means for controlling said power means for adjusting the angular orientation of the tool bar relative to the hitch arm so that the implement follows the desired path of movement in response to said signals from said hitch sensing means and wand sensing means.

7. Apparatus as defined in claim 6 wherein the tool bar has outer walls with a generally rectangular cross section and said power means is located within the tool bar.

8. Apparatus as defined in claim 6 wherein said pivoting means further comprises:

a mounting bracket attached to the tool bar and having at least one forwardly extending flange portion that extends beyond the front of the tool bar and providing a support for a pivot attachment means;

pivot attachment means attached to said mounting bracket and said hitch arm and configured to permit horizontal pivotal movement of said hitch arm relative to said mounting bracket, said pivot attachment means being attached to said hitch arm at a location forward of the rear end thereof;

said power means being attached directly to the rear end portion of said hitch arm rearwardly of said pivot attachment means and to one of said tool bar and mounting bracket, said power means being configured to move said rear end portion of said hitch arm transversely side to side and generally in the lengthwise direction of the tool bar during operation.

9. Apparatus as defined in claim 8 wherein said power means comprises a hydraulic cylinder having a cylinder end and an extendable and retractable piston rod, said cylinder end being connected to one of said tool bar and said hitch arm, and said piston rod being connected to the other thereof, so that movement of said piston rod moves the end portion of said hitch arm generally transverse in the lengthwise direction of the tool bar.

10. Apparatus as defined in claim 9 wherein said hydraulic cylinder is a double acting cylinder configured to both forcefully retract and extend said piston rod.

11. Apparatus as defined in claim 9 wherein the tool bar has a generally hollow rectangular cross section and said mounting bracket comprises upper and lower forwardly extending flange portions that extend beyond the front of the tool bar.

12. Apparatus as defined in claim 11 wherein said mounting bracket generally comprises a U-shaped member having a base portion and said flange portions extending from said base portion, the tool bar fitting within the base portion of the member and said upper and lower forwardly extending flange portions that extend beyond the front of the tool bar.

13. Apparatus as defined in claim 11 wherein said pivot attachment means comprises a pivot pin that extends through apertures located within said tool bar and each of said flange portions.

14. Apparatus as defined in claim 11 wherein the tool bar has an opening in the front face thereof between said forwardly extending flange portions, said rearward end portion of said hitch arm passing through said opening and being attached to said piston rod within the confines of the tool bar.

15. Apparatus as defined in claim 14 wherein said power means includes mounting means to which said cylinder is attached, said mounting means being configured to be inserted through said opening, said mounting means including means for attaching the same to the inside of said tool bar.

16. Apparatus as defined in claim 15 wherein said rearward end of the hitch arm and said power means is configured to pass through said opening.

17. Apparatus as defined in claim 15 wherein said mounting means comprises a pair of spaced elongated plate members each having an aperture located at the end away from said opening through which a pin can pass for attaching said cylinder, each said plate member and the tool bar having a plurality of apertures aligned with one another adjacent the opening, said means for attaching said mounting means comprises a plurality of bolts.

18. In an agricultural implement of the type which has an elongated generally transverse hollow tool bar with a generally rectilinear cross section and a hitch arm having a forward end for attachment to a mounting hitch of a drawing vehicle and means located near the rearward end of the implement for engaging the ground for providing a fulcrum for guiding the implement, the tool bar having an opening in the front face thereof through which a rearward end portion of the hitch arm and pivoting means of the apparatus can pass, apparatus for varying the horizontal angular orientation of the hitch arm relative to the tool bar for the purpose of laterally positioning the implement to follow a desired path as the drawing vehicle draws the implement, said apparatus comprising;

pivoting means including a double acting hydraulic cylinder having a cylinder end and a retractable and extendable piston rod located within the confines of the tool bar, one of said cylinder end and piston rod being attached to said rearward end portion of said hitch arm and the other being attached to said tool bar for generally horizontally pivoting the tool bar relative to the hitch arm to thereby adjust the angular orientation of the hitch arm relative to the tool bar responsive to selective retraction and extension of said piston rod relative to said cylinder;

hitch sensing means for sensing the angular orientation of the hitch arm relative to the tool bar and generating a signal indicative of said sensed orientation;

wand means operatively associated with said apparatus and configured to detect the lateral position of the implement relative to the desired path as the drawing vehicle moves generally along the desired path;

wand sensing means for sensing the position of said wand means and generating a signal that is indicative of said sensed position;

means for controlling said pivot means for adjusting the angular orientation of the tool bar relative to the hitch arm so that the implement follows the desired path of movement in response to said signals from said hitch sensing means and wand sensing means.

19. Apparatus as defined in claim 18 further including mounting means to which said cylinder is attached, said mounting means being configured to be inserted through said opening, said mounting means including means for attaching the same to the inside of said tool bar.

20. Apparatus as defined in claim 19 wherein said mounting means comprises a pair of spaced elongated plate members each having an aperture located at the end away from said opening through which a pin can pass for attaching said cylinder, each said plate member and the tool bar having a plurality of apertures aligned with one another adjacent the opening, said means for attaching said mounting means comprises a plurality of bolts.

* * * * *